United States Patent
Peterson (10) Patent No.: US 7,168,555 B2
(45) Date of Patent: Jan. 30, 2007

(54) EXTENDABLE CONVEYOR

(75) Inventor: Erik S. Peterson, Hojbjerg (DK)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 11/045,971

(22) Filed: Jan. 28, 2005

(65) Prior Publication Data
US 2005/0217981 A1    Oct. 6, 2005

(30) Foreign Application Priority Data
Jan. 30, 2004   (EP)   ................... 04002080
Mar. 19, 2004   (EP)   ................... 04006673

(51) Int. Cl.
*B65G 21/14* (2006.01)
(52) U.S. Cl. ...................... 198/812; 198/588
(58) Field of Classification Search ................ 198/588, 198/595, 812, 594; 193/35 TE
See application file for complete search history.

(56) References Cited

U.S. PATENT DOCUMENTS

| 3,554,355 A | * | 1/1971 | Berg ........................... 198/812 |
| 3,835,980 A | * | 9/1974 | Brooks, Jr. .................. 198/812 |
| 4,474,287 A | * | 10/1984 | Thompson .................. 198/812 |
| 4,643,299 A |  | 2/1987 | Calundan |
| 5,190,352 A | * | 3/1993 | LeBegue et al. ............ 198/588 |
| 5,351,809 A |  | 10/1994 | Gilmore et al. |
| 5,423,413 A |  | 6/1995 | Gilmore |
| 5,487,462 A |  | 1/1996 | Gilmore |
| 5,498,119 A | * | 3/1996 | Faivre ........................ 198/812 |
| 6,006,893 A |  | 12/1999 | Gilmore et al. |
| 6,533,096 B2 |  | 3/2003 | Gilmore et al. |
| 2003/0029694 A1 |  | 2/2003 | Gilmore |
| 2004/0112719 A1 |  | 6/2004 | Gilmore et al. |

FOREIGN PATENT DOCUMENTS

EP    0 122 573 A2    10/1984

OTHER PUBLICATIONS

European Patent Office, *European Search Report*, Jul. 4, 2005, 3 pages.
*European Search Report*, Jul. 6, 2004, 3 sheets.
*European Search Report*, Jul. 14, 2004, 3 sheets.

* cited by examiner

*Primary Examiner*—James R. Bidwell
(74) *Attorney, Agent, or Firm*—Hanley, Flight & Zimmerman, LLC

(57) ABSTRACT

An extendable conveyor comprises a base conveyor section, at least two extendable conveyor sections selectively positionable relative to each other and the base conveyor section, a conveyor member arranged to provide a conveying surface on said conveyor sections, and a number of elongate drive members adapted to drive an associated extendable conveyor section in a forward or backward direction relative to the next inner extendable conveyor section or the base conveyor section, wherein an elongate drive member providing the forward movement of the associated extendable conveyor section comprises at least one anchor point disposed to a suitable height such that the elongate drive member is arranged above a bottom plane of the next inner extendable conveyor section.

24 Claims, 8 Drawing Sheets

EXTENDABLE CONVEYOR

RELATED APPLICATIONS

This application claims the benefit of the filing dates of European Application Nos. 04 002 080.2, filed on Jan. 30, 2004, and 04 006 673.0, filed on Mar. 19, 2004, the disclosures of which are incorporated by reference herein in their entireties.

TECHNICAL FIELD

The disclosure relates generally to extendable conveyors such as telescopic belt or roller conveyors, and more particularly to an extendable conveyor comprising a base conveyor section and at least two extendable conveyor sections and a number of elongated drive members adapted to drive an associated extendable conveyor section in a forward or backward direction relative to the next inner extendable conveyor section or the base conveyor section.

BACKGROUND

Extendable belt conveyors of the type mentioned above are known and used in the art. For example, U.S. Pat. No. 4,643,299 discloses a telescopic belt conveyor comprising a first basic conveyor section within a longitudinal housing, which at one end is provided with an opening, through which a number, by way of example two, three or more, of telescopic conveyor sections are arranged within each other. These telescopic conveyor sections may be telescopically moved in and out in relation to each other, as the conveyor sections are mutually connected by means of a suitable system of drive members, such as drive chains, and in relation to said basic conveyor section, which is provided with a common drive system for controlling the telescopic movement.

However, the known extendable or telescopic conveyors are encumbered with some disadvantages which may cause serious working accidents. There is a risk, especially during the telescopic movement of the respective telescopic conveyor sections that personnel may get hands or fingers squeezed between the respective conveyor sections. Another potential risk is that the drive chains of the intermediate conveyor sections, when the undersides these sections are exposed during outward and inward movements, may cause damages especially to hands and fingers.

Further, when designing and producing telescopic belt or roller conveyors of the type mentioned above it would of course be of great benefit in terms of costs for inventory and/or tooling, if it becomes possible to work with a minimum of different parts when assembling the respective conveyor sections.

DETAILED DESCRIPTION

Figure 1:
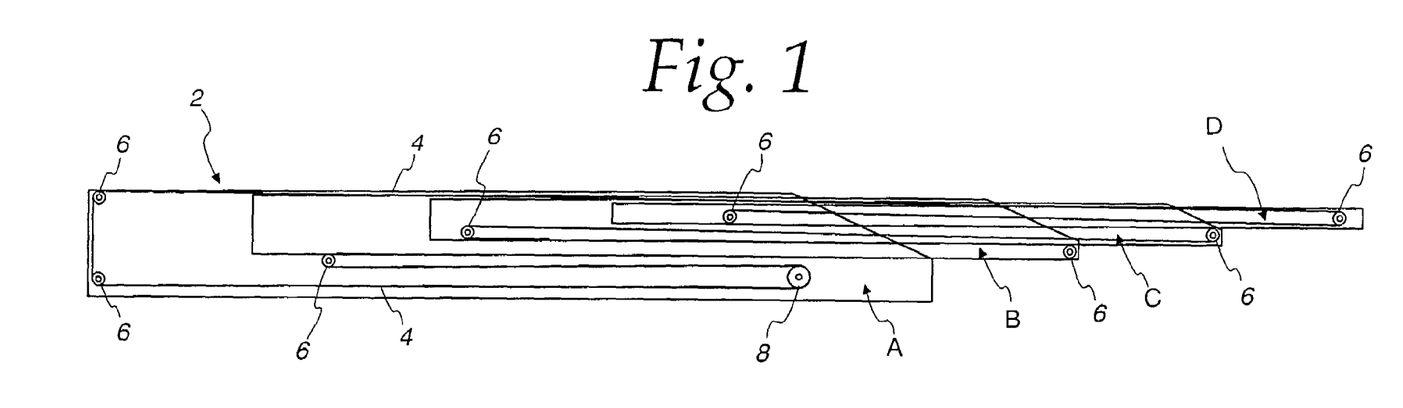
FIG. 1 shows a schematic plane side view of the course of an endless conveyor belt in an example for a telescopic belt conveyor.

FIG. 1 shows a side view of an example of an extendable belt conveyor: a telescopic belt conveyor. However, before proceeding further with the detailed description of FIG. 1, a few items of some of the preferred examples will be discussed.

In one example the extendable conveyor comprises a base conveyor section, which, e.g. can be mounted on a floor or can be movable on tracks, rollers, etc., and two or more extendable conveyor sections selectively positionable relative to each other and the base conveyor section, and a conveyor member. The conveyor member for conveying, e.g. products, parcels, or similar and arranged to provide a conveying surface comprises rollers or an endless conveyor belt. In the following the examples relate to extendable conveyors with an endless conveyor belt. The extendable sections are moved by a number of elongate drive members which are adapted to drive an associated extendable conveyor section in a forward or backward direction. These elongate drive members are, for example, chains which are driven by an electric motor. The conveyor belt is in some examples driven independently from the conveyor sections, e.g. by another electric motor. The elongate drive members are anchored or connected to the extendable sections and the base conveyor sections such that the associated conveyor section, i.e. the conveyor section which is moved by the elongated drive member, can be moved in a forward and/or backward direction. Here the forward and backward direction refers to the base section, i.e. a conveyor section moving away from the base section is moving in the forward direction, while a conveyor section moving towards the base section is moving in the backward direction; or the forward and backward direction refers to a next inner conveyor section; the next inner conveyor section is—as seen from the associated conveyor section—the next section which is nearer to the base section.

In an example the elongate drive member moving the conveyor section next to the base section is actively driven by, e.g. an electric motor in the base section and is anchored to the next outer extendable conveyor section. All other elongate drive members in the example are passively driven. Thus, the drive force of, e.g. the motor driving the elongate drive member in the base section, is transferred over elongate drive members connected between the different conveyor sections. In the following the conveyor sections will be numbered: the base section, a next outer section is the first section, the following next outer section is the second section, etc. Another way to indicate the different conveyor sections is: starting from an associated (i.e. moved) section (e.g. the third section), the next inner section (i.e. second section) and the inner section following the next inner section (i.e. the first section in this example). Of course, in the examples the next inner section or the inner section following the next inner section can be the base section. The single conveyor sections are nested inside each other. When the extendable conveyor is in a totally retracted position in the extendable conveyor sections a rear area will be left free, i.e. the single conveyor sections will not touch each other at the back sides such that some space is left for anchor points at which the elongate drive members will be connected in some examples. In the example the first conveyor section is moved by at least one elongate drive member disposed and driven in the base section and anchored with the first section. Elongate drive members running in the first section are anchored to the second section but they are not necessarily anchored to or in the first section; in some examples they are anchored in the base section. A third section is driven by elongate drive members running in the second section and being anchored to the third section, and so on. Thus, in the example the conveyor sections are not necessarily connected one after the other, i.e. the base section is connected over elongate drive members to the first section, the first section is connected over elongated drive members to a second section, the second is connected over elongate drive members to a third section, etc.; it is also possible to connect the base section to the second section, and the first section to the third section, etc.; even a mixture of the different ways of connection is possible, e.g.: the base section is connected to the first section, the second section is connected to the base section, a third section is connected to the first section, etc. With the expression 'connection' as used here above, the connection via elongate drive members and their transferring of the drive force is meant.

When extending a belt conveyor in the forward direction, the forward-moving elongate drive members must not cross the bottom plane of the conveyor sections if the bottom plane is to be closed with, e.g. a plate. In one example, the forward-moving elongate drive members are arranged at such a height that they do not cross the bottom plane of the next inner conveyor sections. In a preferred example this is achieved by mounting at least one anchor point of the forward moving elongate drive member on the inner section following the next inner section or on the base section in a position which is raised relative to the bottom plane of the next inner conveyor section. As explained above, the elongate drive members move the associated conveyor section and the next inner conveyor section is the next section nearer to the base section, seen from the associated conveyor section. The height of the drive members can be defined as the height measured from the bottom of the base section to the point in question. Another way is to measure the height from the bottom plane of the section in which the elongate drive member runs to the point in question, i.e. in some examples the bottom plane of the next inner section.

In some examples the forward and backward moving elongate drive members are connected at a common anchor point such that they provide a continuous elongate drive member. This continuous drive member—e.g. running in the first extendable section—is, e.g. connected to the second extendable conveyor section at two anchor points. One anchor point is disposed on underneath of the second extendable conveyor section and the other at the rear end of the second extendable conveyor section. The mutual anchor point of the forward and backward moving elongate drive members is, in this example, mounted on or connected to the base section. So, starting, e.g. from one anchor point on the underneath of the associated (i.e. moved) extendable conveyor section, the elongate drive member is guided over a guiding element arranged in a fore segment in the next inner conveyor section to the common anchor point, which is connected in the fore area of the next section following the next inner section, and then the elongate drive member is guided over another guide element in the rear segment of the next inner section to the other anchor point which is disposed at the rear end of the associated conveyor section. Thus, the elongate drive member in this example describes a course similar to an ellipse-like shape; the ellipse-like shape is not closed and the end points of the ellipse are connected to the associated conveyor section, as described above. The common anchor point is positioned at the lower run of the ellipse-like shape and mounted on the inner section following the next inner section, and the guide elements are disposed at the two strong turnings of the ellipse in the next inner section.

The elongate drive members in some examples are, e.g. chains or wire ropes. These kinds of elongate drive members sag due to gravitation force and could therefore cross the bottom plane of the conveyor section in which they are running. To prevent this crossing of the bottom plane, in some examples elements arranged to raise the continuous drive members are provided. In some examples the raising element comprises, e.g. brackets, on which the elongate drive member is mounted at the common anchor point. The brackets are, for example, upside down L-shaped and are mounted on the next inner extendable section or the base section in a position offset from the run of the elongate drive member and arranges the elongate drive member above said bottom plane. In this example the brackets and the elongated drive member are covered from underneath by L-shaped guard member.

In another example, the forward and backward moving elongate drive members are separately mounted and not connected to each other, especially the forward and backward moving elongate drive members moving the second, third, etc., conveyor sections. The elongate drive member in the base section which moves the first section comprises, in some examples, only consists of a single elongate drive member, i.e. the forward and backward moving elongate drive members are connected to each other and build a continuous elongate drive member while the other elongate drive members are separately mounted. The elongate drive member running in the base section is connected, as explained above, e.g. on the underneath and at the rear end or rear area of the first conveyor section and is driven by, e.g. a motor. Elongate drive members moving the second and the following sections are only passively driven, as explained above.

In some examples the run of the elongate drive members running in the first conveyor section, which move the second conveyor section is, e.g. the following: one end of the forward moving elongate drive member is anchored to a first anchor point underneath the associated conveyor section (e.g. the second movable section). Starting at this anchor point and following the run of the forward-leading elongate drive member, the elongate drive member is guided over a guide element in the fore area of the next inner conveyor section (e.g. the first movable section), turns around and extends backwards along and through the next inner conveyor section (e.g. the first movable section). In the rear area of the next section following the next inner conveyor section (e.g. the base section) the elongate drive member is mounted to a second anchor point in a raised position relative to the bottom plane of the next inner conveyor section (e.g. the first movable section).

In other examples the elongate drive member is guided through an opening in the rear wall or an open rear wall of the next inner conveyor section (e.g. the first extendable section) and is mounted to a second anchor point in the rear area of the inner section following the next inner section (e.g. the base conveyor section). This second anchor point has a raised position relative to the bottom plane of said inner conveyor section (e.g. the first extendable section) such that the elongate drive member does not cross the bottom of the next inner conveyor section (e.g. the first extendable section). Additionally, in some examples the guide element for guiding and turning/altering the direction of the elongate drive member is raised also to prevent the elongate drive member touching the bottom plane of the next inner conveyor section (e.g. the first section). The backward moving elongate drive member running in the next inner conveyer section (e.g. the first extendable section) and moving the associated conveyor section (e.g. the second extendable conveyor section) is anchored on the underneath of the associated conveyor section (e.g. the extendable second section) at a first anchor point. Starting from this first anchor point the elongate drive member runs in a backward direction over a guide element in the rear area of the next inner conveyor section (e.g. the first extendable section), turns around, runs forward through the bottom in the rear area of the next inner conveyor section (e.g. the first extendable section) and is anchored in the inner section following the next inner conveyor section (e.g. the base section).

Examples having a third or more extendable conveyor sections have similar elongate drive member runs as described above. The forward running elongate drive member moving the third extendable conveyor section, for example, runs in the second extendable conveyor section and is anchored at one end on the underneath of the third extendable conveyor section. It runs in a similar way as described above for the forward moving elongate drive member moving the associated (second) conveyor section. It runs over a guide element in the fore area of the second conveyor section, turns around and goes back through the second conveyor section. In some examples the elongate drive member is guided through an opening in the rear wall or an open rear wall of the second extendable conveyor section and the end point of the elongate drive member is then anchored in the rear area of the first extendable conveyor section.

In some other examples one anchor point of the elongate drive member providing the backward movement is disposed on the rear wall or in the rear area of the associated conveyor section.

In still other examples the extendable conveyor comprises a number of elongate drive members adapted to drive an associated extendable conveyor section in a forward or backward direction relative to the next inner extendable conveyor section or the base conveyor section. The elongate drive members comprise at least a first elongate drive member providing the forward movement of the associated extendable conveyor section and a second elongate drive member providing the backward movement of the associated extendable conveyor section. The first elongate drive member is separately mounted from the second elongate drive member.

The chain run and the anchor point position of the elongate drive members in this example are preferably similar to that example explained above in which the forward and backward moving elongate drive members are separately mounted. In some examples an anchor point of the first elongate drive member is disposed at a suitable height such that said first elongate drive member is arranged above a bottom plane of the next inner extendable conveyor section. Such an anchor point is, e.g. in the rear area of the inner section following the next inner section. In these examples the forward-moving elongate drive member extends through an open rear wall of the next inner extendable conveyor section to be anchored in the rear area of the inner section following the next inner section or in the base conveyor section in a raised position relative to the bottom plane of said inner conveyor section. Additionally in some examples a guide element is mounted in such a height (above a bottom plane of the next inner conveyor section) that the elongate driver member can be guided through the open rear wall of the next inner conveyor section.

In some examples one end of said elongate drive members (i.e. the forward moving or the first) is mounted at an anchor point in the rear area of the inner section following the next inner section or in the base conveyor section in a raised position relative to the bottom plane of said inner conveyor section. In other examples a guide element for leading the forward moving elongate drive member or the first elongate drive member is mounted in such a height that the elongate driver member does not cross a bottom plane of the next inner extendable conveyor section. In some examples even said anchor point and said guiding element are in a raised position such that the elongate drive member does not cross a bottom plane of the next inner conveyor section.

In some other examples a guide element for leading the backward moving or the second elongate drive member is mounted in the rear area of the next inner conveyor section, or the guide element is mounted on the outside of the rear wall or on the outside of the rear area of said conveyor section.

In some examples the elongate drive members can be drive chains or wire ropes and the elongate drive members (e.g. drive chains or wire ropes) are arranged to be housed within side guides of each conveyor section. In some examples the elongate drive members are mounted only on one side of each conveyor section.

In some examples at least an exposed bottom i.e. the part of the bottom which is reachable/accessible when the extendable conveyor sections are in a fully extended position, of the at least outermost extendable conveyor sections is covered. In a preferred example wherein elongate drive member providing the forward movement is connected to a respective elongate drive member providing the backward movement at the anchor point to define a continuous elongate drive member, the bottom of at least the outermost of the extendable conveyor sections is completely covered.

In another example having a number of elongate drive members adapted to drive an associated extendable conveyor section in a forward or backward direction relative to the next inner extendable conveyor section or the base conveyor section, at least the extendable conveyor sections have a constant internal width. In this example the extendable telescopic conveyor sections have different external widths but the same constant internal width. The external width of an extendable section is defined as the width or distance in cross section measured from a left side wall to a right side wall of the extendable section. The external width of each next inner conveyor section is smaller than the external width of the associated outer conveyor section because the extendable conveyor sections are nested disposed. In a preferred example, to define the internal width, the extendable conveyor sections may be considered to have a rectangular-like shape in cross section. On top of the rectangular runs the conveying surface. The underside of the rectangular shows an opening having a smaller width than the width of the rectangular and is centered such that the left and right edges of the opening have a defined distance from the side walls of the rectangular (i.e. the side walls of the extendable conveyor sections). In this example the width of the opening, i.e. the separation of this rectangular is the same in each extendable conveyor section and defines the constant internal width of the extendable conveyor section. Thus, the internal width of the conveyor section is different from the width measured from the left inner side wall to the right inner side wall of the extendable conveyor section. The distance of each the left and right edges of the opening (i.e. the internal width) to the left inner side wall and the right inner side wall, respectively, varies for different extendable conveyor sections.

Since the internal width of the different extendable conveyor sections is constant, the dimensions of a structure arranged within the opening can also be the same for the different extendable conveyor sections. Such structure includes, for example, belt rollers, reversing rollers, crossbars, carrying girders, bottom plate covers, etc.

In another example, the internal width defines the separation between side guides of the conveyor sections extending along the conveying track, i.e. the upper left and right corner part in the above rectangular. A structure having the same dimension in each extendable conveyor section is, for example, a skid plate for guiding the conveyor belt.

Since the internal width of the different extendable conveyor sections is constant, the dimensions of structures build in the opening can also be the same for the different extendable conveyor sections. Such structures are, for example, belt rollers and skid plates guiding the conveyor belt, reversing rollers, crossbars, carrying girders, bottom plate covers, etc.

In another example supporting elements on which e.g. belt rollers are mounted are arranged on the inner side of each side wall in an opposed relationship such that the width or separation between the supporting elements is the same in each extendable conveyor section. Such supporting elements may have an L-like shape or turned L-like shape. On the supporting elements in this example structure, e.g. belt rollers, crossbars, girders, bottom plates, reversing rollers, etc., can be mounted. Due to the same internal width of the extendable conveyor sections all these structures or parts can have the same dimensions, or at least the same width or length.

In still another example in the side guides, i.e. the place between the supporting elements and the side walls of the extendable conveyor sections (i.e. the places on the left and right inner side of the extendable conveyor section which are left and right beneath the opening defining the constant internal width) guide elements arranged to guide the drive members, are disposed.

Returning now to the specific example of FIG. 1, the telescopic belt conveyor 2 comprises four sections, namely a basic section A, two intermediate sections B and C and an outermost section D. The sections B, C and D may be moved in and out in a telescopic manner in relation to each other and in relation to the basic section A. The belt conveyor 2 comprises an endless conveyor belt 4, which (cf. FIGS. 1 and 2) is lead around a number of stationary reversing rollers 6 in the respective sections A–D, and which is driven by a common, reversible drive roller 8, which is positioned in section A, and which is driven by a motor, illustratively an electric driving motor, although hydraulic or other motor types could be used.

The telescopic movement of the sections B–C may be carried out in a variety of ways.

Figure 3:
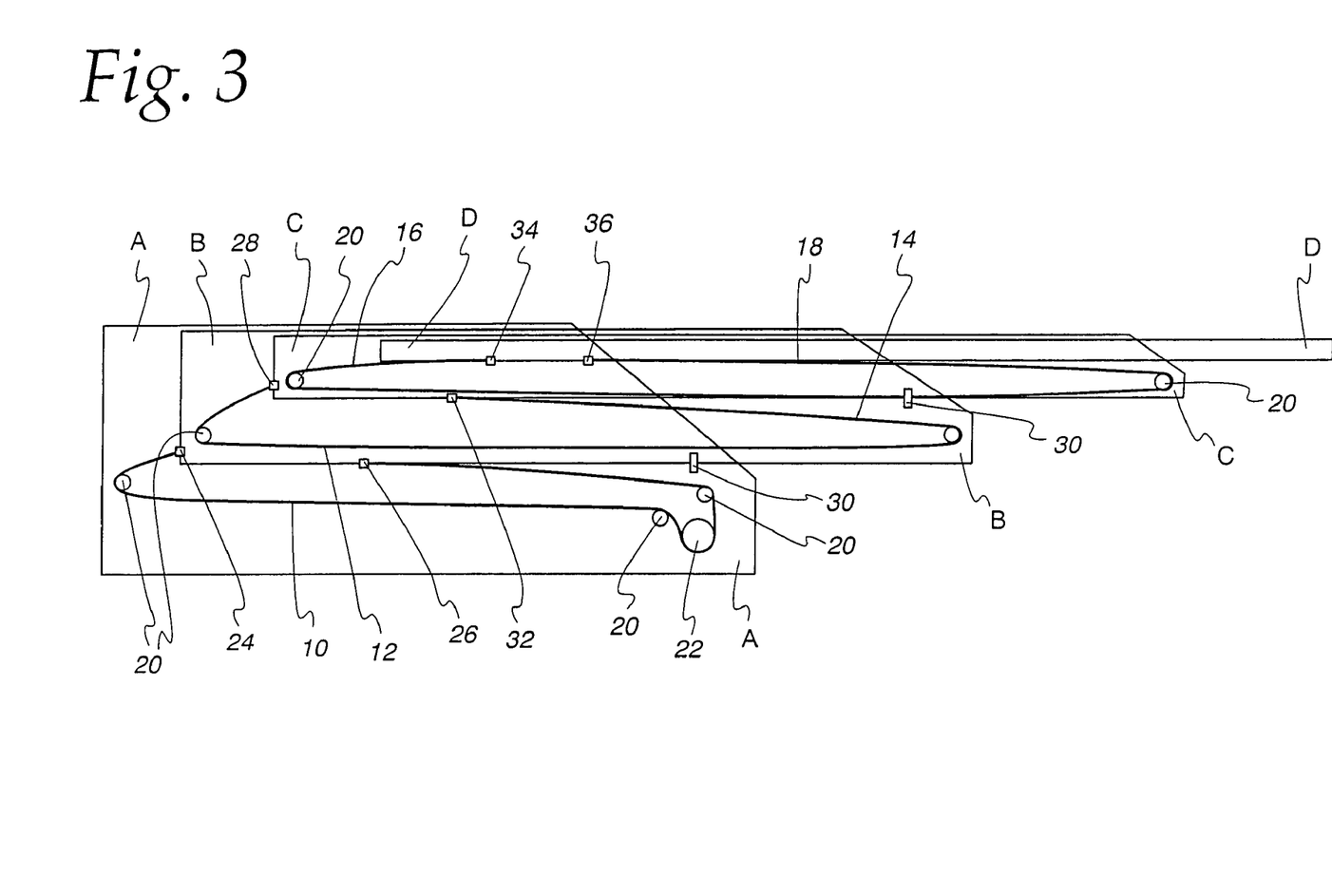
FIG. 3 shows a simplified side view of an example of a telescopic belt conveyor with partly extended conveyor sections.

In FIG. 3 a schematic view of the telescopic belt conveyor is shown. In this example the conveyor sections are moved by chains 10, 12, 14, 16, and 18, respectively. The chains run over a stationary sprocket wheels 20 and only chain 10 is driven by a wheel 22 connected to a motor. The chain 10 runs in the basic section A and is connected at its ends on the next outer conveyor section B at connection points 24 and 26, while the chains 12 and 14 run in an ellipse-like course in conveyor section B and are mounted at its ends on conveyor section C at connection points 28 and 32. Chains 14 and 16 which move section D run in a similar fashion. By this way of connecting the single conveyor sections to each other, the drive force of chain 10 is carried over the other chains 12, 14, 16 and 18 and the conveyor sections B, C and D are moved simultaneously inwardly or outwardly. Chains 12 and 16 move the conveyor sections C and D backwards and chains 14 and 18 forwards. In this example the chains 12 and 14 are connected together as well as chains 16 and 18 at a common anchor point 30 where, additionally, a bracket or chain mounting is mounted. This bracket is mounted on the base section A (or section B, respectively) and raises the chain at the common anchor point 30 of the corresponding chains 12, 14 and 16, 18. Additionally in some examples the forward leading chains are raised by corresponding sprocket wheels 20, which are in a raised position, too.

Figure 4:
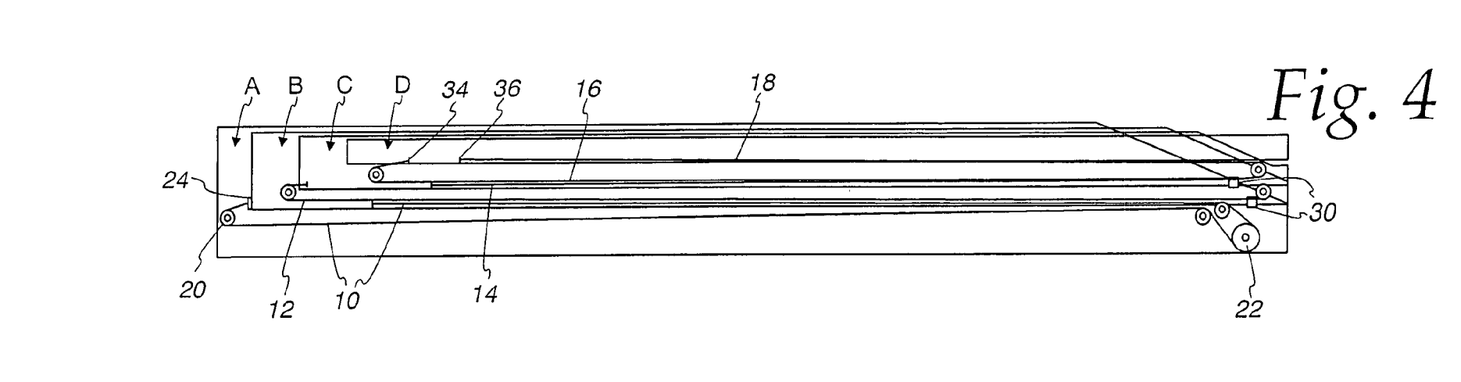
FIG. 4 shows a plane schematic side view of an example for a telescopic belt conveyor shown with the telescopic conveyor sections in a retracted position.
Figure 5:
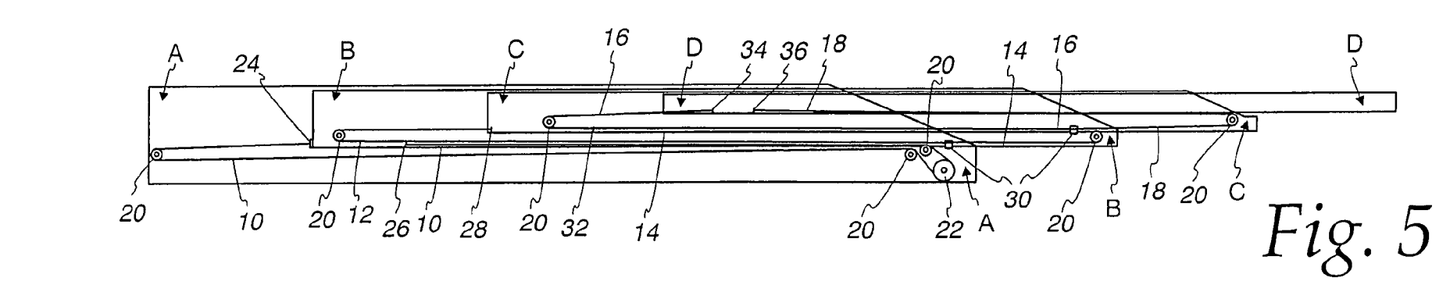
FIG. 5 shows a corresponding plane view of the course of drive chains between the respective telescopic conveyor sections shown in a partly extended position in relation to a basic conveyor section.
Figure 6:
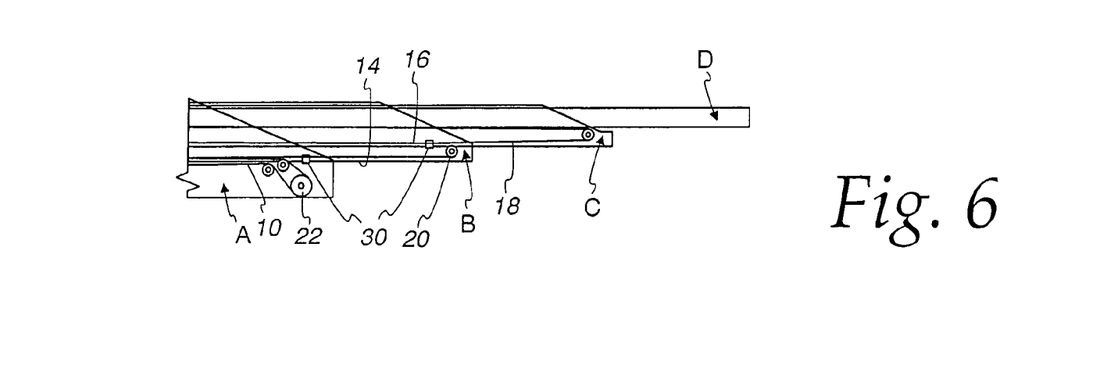
FIG. 6 shows a side view of an outermost part of the telescopic belt conveyor shown in FIG. 4 in an extended position.

FIGS. 4–6 show a more detailed view of the telescopic belt conveyor of this example. The movement of the conveyor sections is carried out by means of elongated drive members in the form of chains 10, 12, 14, 16 and 18, which are disposed at opposite long sides of the belt conveyor 2. The drive chains 10, 12, 14, 16 and 18 run between the respective sections A–D around stationary sprocket wheels, as opposite ends of each of the drive chains 10, 12, 14, 16 and 18 are anchored to two sections. The drive chains 10 are furthermore led around driving sprocket wheels 22, which are placed in the front end of section A, and which are driven by means of a reversible electric driving motor (not shown). End parts of the drive chains 10 are anchored at 24 to a rearmost end part of section B, from where the drive chains 10 are led around stationary sprocket wheels 20 into the rearmost end of the basic section A and forward around a second stationary sprocket wheel 20, around the drive sprocket wheels 22 and back again around a third stationary sprocket wheels 20 to anchor points 26 at the underside of section B some distance in front of the rearmost end of section B.

Figure 7:
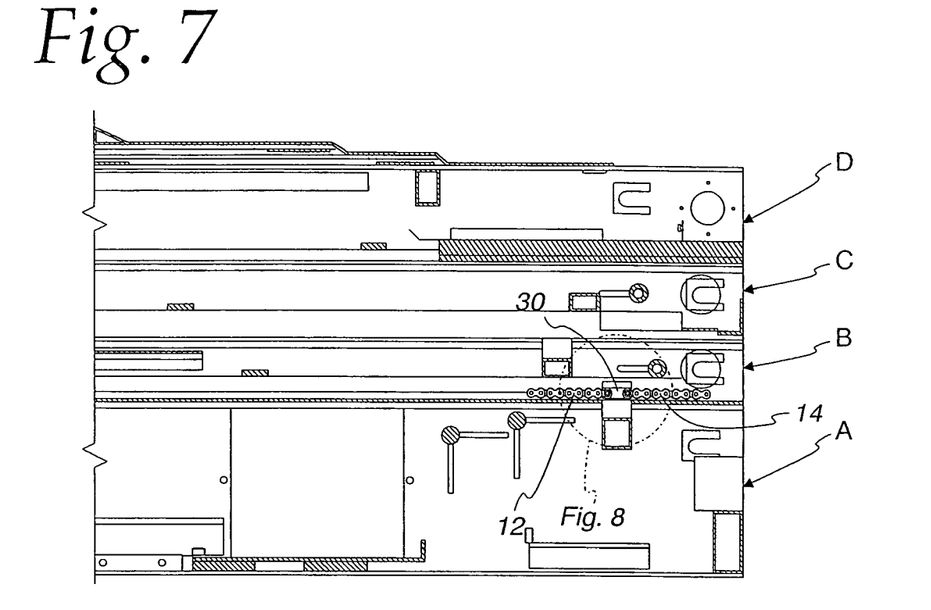
FIG. 7 shows a simplified side sectional view through an outermost part of the belt conveyor position of FIG. 4 in a retracted position.
Figure 8:
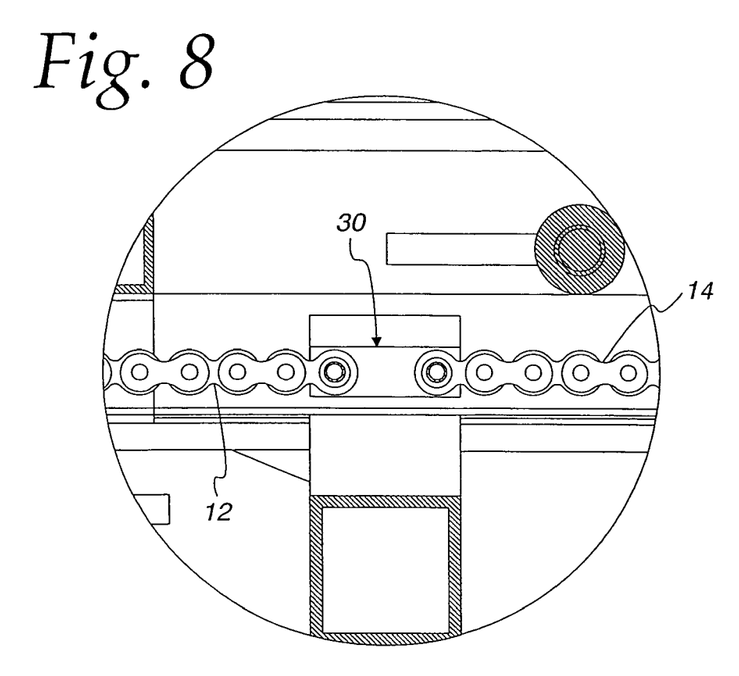
FIG. 8 shows an enlarged view of an indicated section in FIG. 7.

Similarly, end parts of the drive chains 12 are rearmost in section C anchored at 28, from where the drive chains 12 are led around stationary sprocket wheels 20 placed in the rearmost end of section B and forward to the rear sides of cranking chain mountings 30 (FIG. 7) in the front end of basic section A. End parts of the drive chains 14 are anchored to the front side of the same chain mounting 30 in the front end of basic section A, from where the drive chains 14 are led forward and around stationary sprocket wheels in the front end of section B and again backwards to anchor points 32 on the underside of section C some distance in front of the anchor points 28.

In a similar manner, end parts of the drive chains 16 are anchored at 34 rearmost in section D, from where the drive chains 16 are led backwards around stationary sprocket wheels placed rearmost in section C and again forward to the rear sides of cranking chains mountings 30 in the front of section B. End parts of the drive chains 18 are anchored to the front sides of the same chain mounting 30 in the front of section B, from where the drive chains 18 are led forward and around stationary sprocket wheels 20 in the front end of section C and again led backwards to anchor points 36 on the underside of section D some distance in front of the anchor points 34.

Figure 9:
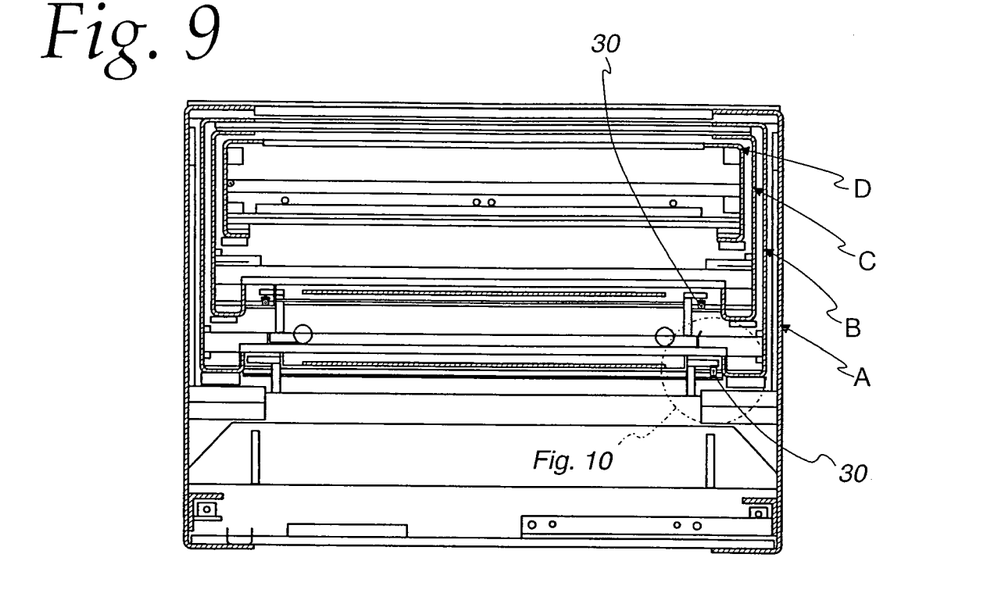
FIG. 9 shows a simplified transverse sectional view through an outermost part of the telescopic belt conveyor of FIG. 4.
Figure 10:
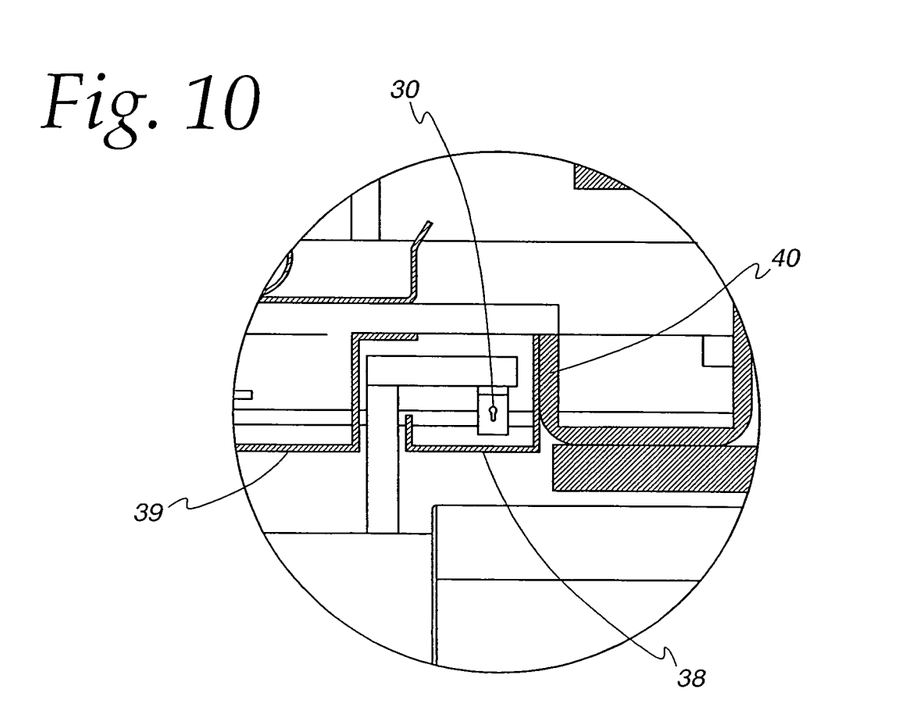
FIG. 10 shows an enlarged view of an indicated section in FIG. 9.

FIGS. 7–10 show the position and more details about the cranking chain mountings 30 as discussed above, which are placed in the front ends of sections A and B, and which are used for the anchoring of end parts of the drive chains 12, 14, 16 and 18. Furthermore, the examples of FIGS. 9 and 10 show longitudinal coverings 38 for the lower course of the drive chains 14 and 18 by the intermediate sections B and C. These longitudinal coverings 38 are at both sides of the belt conveyor 2 suspended at the inside of longitudinal carrying girders 40 of the intermediate sections B and C.

In this example the longitudinal coverings are made possible by the configuration of cranking mountings 30, which serve to raise the lower runs of chains 12, 14, 16 and 18 above their conventional positions without chain mountings 30. Without this raising of the lower runs of the chains, the longitudinal coverings would not be possible, as they would be in an interfering position between sections such as would prevent proper telescopic operation.

In a preferred example, the entire underside of each of the telescopic conveyor sections results to be closed or covered by the combination of the chain guard 38 and the belt guard 39—as shown to the left of FIG. 10. The raised anchor points 30 for the chains allows the chain guard 38 to be positioned as it is, and fills the side gap that used to exist where the belt guard 39 ended and the unguarded chains ran. The combination of the chain guard 38, the bracket for holding mountings 30 and the belt guard 39 present what is in effect a closed bottom, although not the complete closed bottom of the preferred example.

In these examples the respective conveyor sections B, C and D in relation to each other and in relation to the basic conveyor section—as per se known—are supported and guided in the transverse direction by means of stationary rollers provided with external guiding flanges, which cooperate with longitudinal carrying girders.

Figure 2:
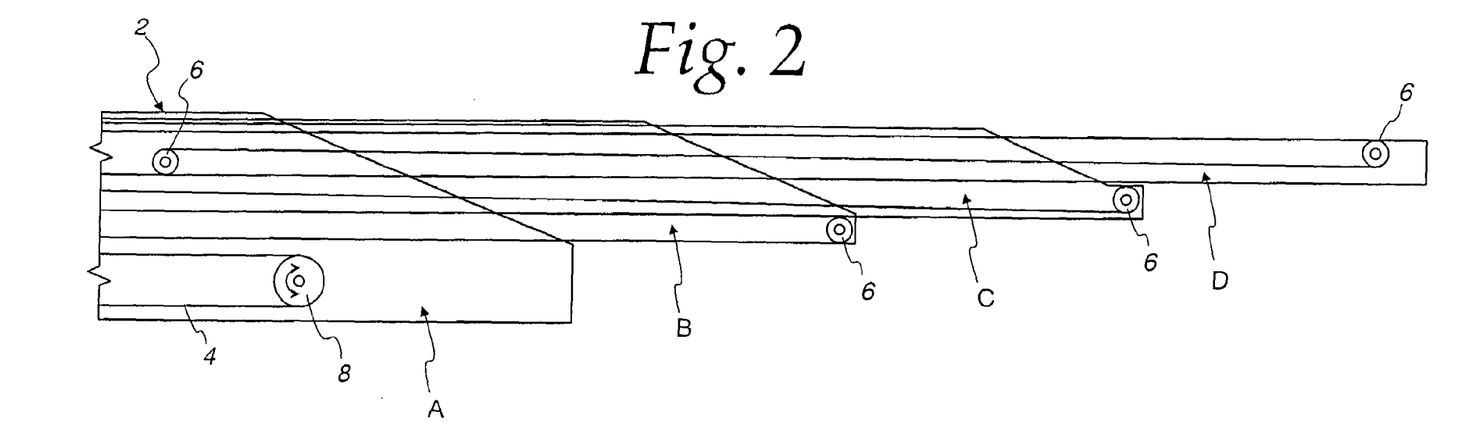
FIG. 2 shows a corresponding side view of an outer part of the telescopic belt conveyor shown in FIG. 1.

In another example, in a preferred example for a telescopic belt conveyor 56 the course of the endless conveyor belt 4 is in principle just the same as shown in FIGS. 1 and 2, while the course of the respective drive chains as shown in FIGS. 11–14 is differently arranged to that that of the drive chains 10, 12, 14, 16 and 18 by the telescopic belt conveyor 2 as described above with reference to FIGS. 3–10.

The telescopic belt conveyor 56 according to this example comprises four sections, namely a basic section A, two intermediate sections B and C and an outermost section D. The sections B, C and D may be moved in and out in a telescopic manner in relation to each other and in relation to the basic section A. The belt conveyor 56 comprises an endless conveyor belt 4, which cf. FIGS. 1 and 2 is lead around a number of stationary reversing rollers 6 in the respective sections A–D, and which is driven by a common, reversible drive roller 8, which is positioned in section A, and which is driven by a motor such as an electric or hydraulic driving motor.

Figure 11:
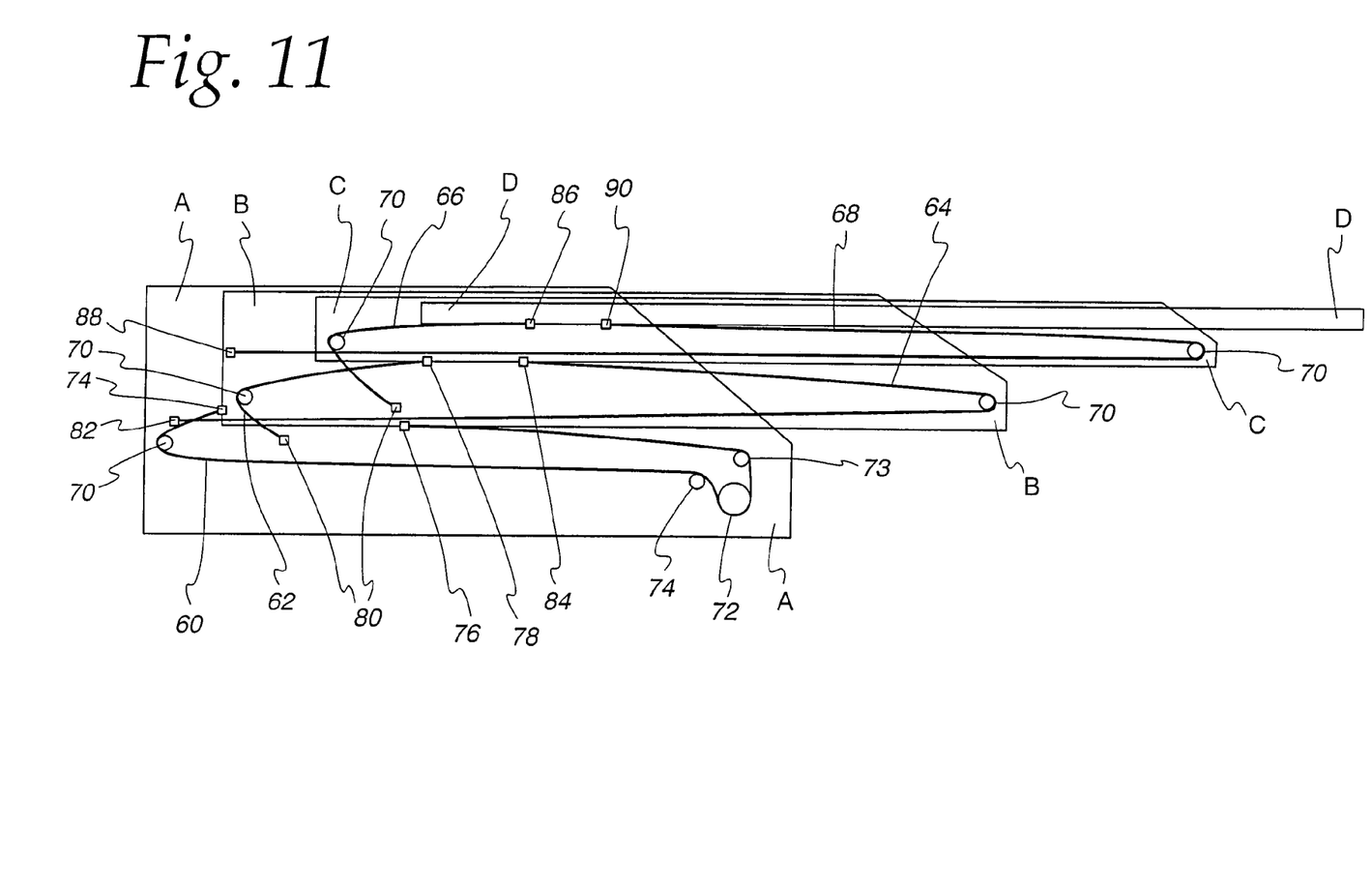
FIG. 11 shows a simplified side view of another example of a telescopic belt conveyor with partly extended conveyor sections.
Figure 13:
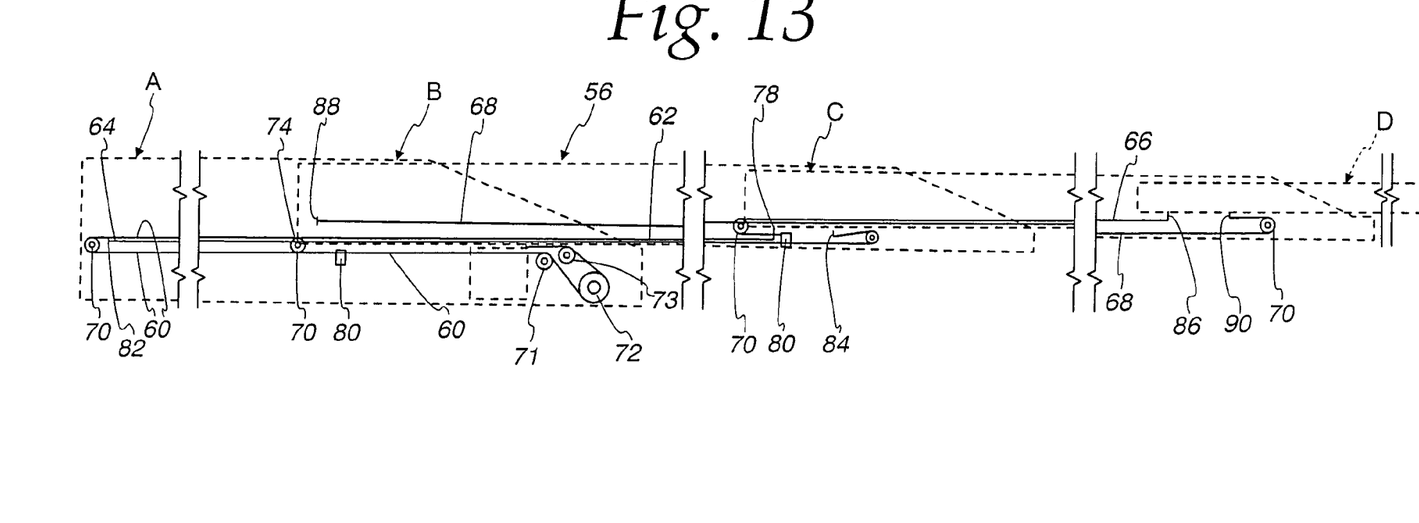
FIG. 13 shows a corresponding plane view of the course of drive chains between the respective telescopic conveyor sections shown in a partly extended position in relation to a basic conveyor section.

The drive chain configuration according to this example is schematically shown in FIG. 11. The forward-and backward-leading chains 60, 62, 64, 66, and 68, as shown in FIG. 13, are separate and separately mounted. The forward leading chains 64 and 68 extend through an open rear wall of the conveyor sections B and C, respectively. At one end the forward leading chain 64 is mounted on conveyor section C at position 84 and on the rear end of conveyor section A at position 82. Similarly, the ends of chains 68 are mounted on conveyor section D at position 90 and on the rear end of conveyor section B at position 88. The mounting points 82 and 88 are at such a height that the forward-leading chains 64 and 68 do not cross the bottom of the corresponding conveyor sections B and C, respectively. The backward-leading chains are guided through the bottom at the rear end of conveyor sections B and C. The other end points of the backward-leading chain 62 are mounted in the base conveyor section A at position 80 and on conveyor section C at position 78. Similarly, the end points of the backward leading chain 66 are mounted at position 80 in conveyor section B and at position 86 on conveyor section D.

Figure 12:
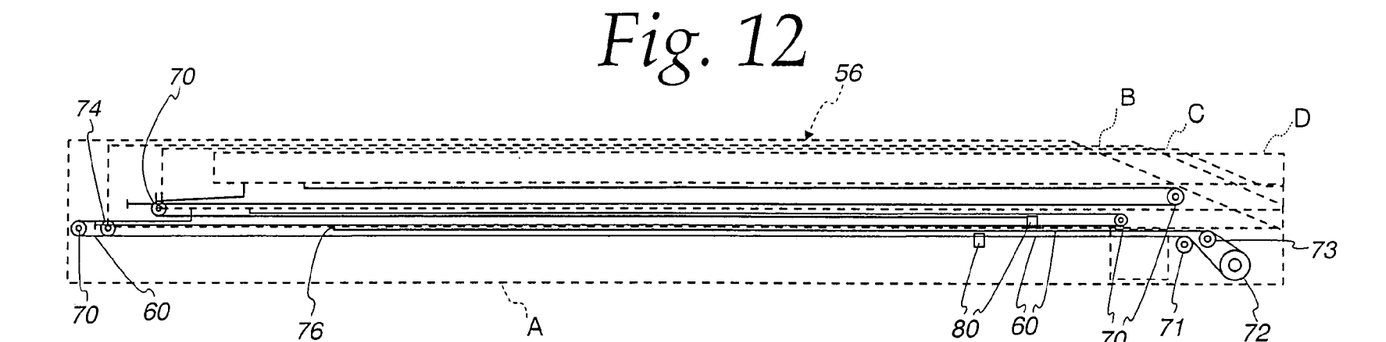
FIG. 12 shows a plane schematic side view of an example telescopic belt conveyor shown with the telescopic conveyor sections in a retracted situation.

FIGS. 12 and 13 show a detailed view of this example. The telescopic movement of the sections B–C is carried out by means of drive chains 60, 62, 64, 66 and 68, which are disposed at opposite longitudinal sides of the belt conveyor 56 and run between the respective sections A–D around sprocket wheels mounted stationary in the respective sections A–D, as opposite ends of each of the drive chains 60, 62, 64, 66 and 68 are anchored to two sections. The drive chains 60 are furthermore led around driving sprocket wheels 72, which are placed in the front end of section A, and which are driven by means of a (not shown) reversible electric or other driving motor. End parts of the drive chains 60 are anchored at 74 to a rearmost end part of section B, from where the drive chains 60 are led around stationary sprocket wheels 70 into the rearmost end of the basic section A and forward around stationary sprocket wheels 71, around the drive sprocket wheels 72 and back again around stationary sprocket wheels 73 to anchor points 76 on the underside of section B some distance in front of the rearmost end of section B.

End parts of the drive chains 62 are rearmost in section C anchored at 78, from where the drive chains 62 are led around sprocket wheels 70 mounted on the rearmost wall section B and forward to chain mountings 80 in the front end of basic section A. End parts of the drive chains 64 are anchored near the rearmost end of section A at 82, from where the drive chains 64 are led forward and around stationary sprocket wheels 70 in the front end of section B and again backwards to anchor points 84 on the underside of section C some distance in front of the anchor points 78.

End parts of the drive chains 66 are anchored at 86 rearmost in section D, from where the drive chains 66 are led backwards around sprocket wheels mounted 70 on the rearmost wall of section C and again forward to chains mountings 80 in the front of section B. End parts of the drive chains 68 are anchored near the rearmost end of section B at 88, from where the drive chains 68 are led forward and around stationary sprocket wheels 70 in the front end of section C and again led backwards to anchor points 90 on the underside of section D some distance in front of the anchor points 86.

Figure 14:
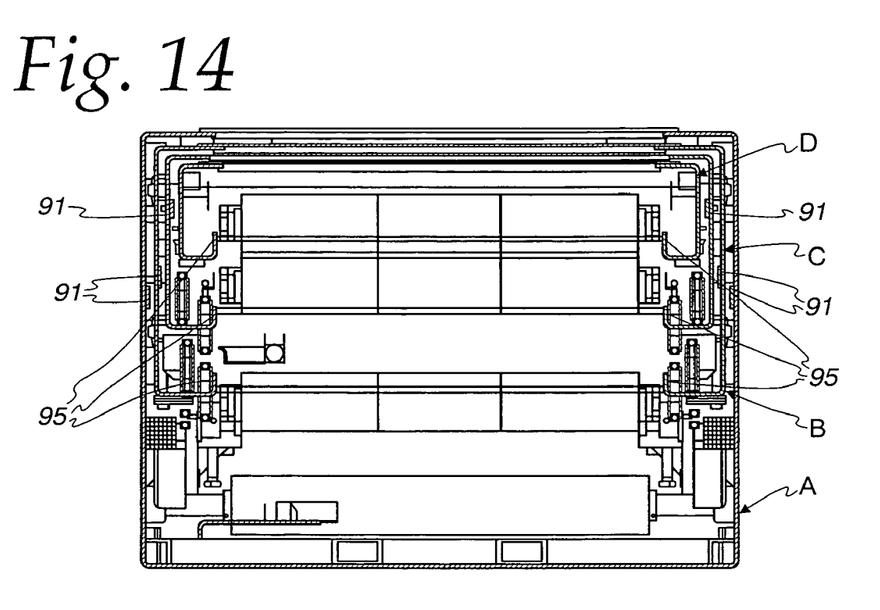
FIG. 14 shows a transverse sectional view through an example for a telescopic belt conveyor.

The example of FIG. 14 shows that the various sprockets wheels 70 may be offset laterally to achieve the orientation of the chains shown in FIGS. 12 and 13.

One of the benefits of the drive chains in this preferred example is that there is basically an absence of chain runs (top or bottom) passing through the plane defined by the bottom of sections B, C or D, or at least the parts thereof exposed during telescopic movement. As a result, the undersides of these sections or at least the parts of the undersides exposed during the telescopic movement may be provided with closed coverings preventing any possible penetration into the underside of the sections and thus preventing accidents causing damage to hands, fingers or other body parts of the user, which could otherwise be damaged or injured by engaging said undersides during said telescopic movement.

In this example, this benefit is obtained by the fact that the anchor points of the drive chains, such as anchor points 82 and 88 for drive chains 64 and 68, respectively, are disposed at a suitable height to allow their bottom runs to be led through the opening in the rear of sections B and C and to stay above the undersides thereof. Further, the sprocket wheels 70 mounted at the rearmost walls of sections B and C and at the bottom thereof make it possible that the drive chains 62 and 66 may also be led through openings in the rear walls of sections B and C, and then have a lower run below the underside of the respective sections, but only in an area that will not be exposed during the telescopic movements. Accordingly, the undersides of these sections or at least the parts of the undersides exposed during the telescopic movements may be provided with coverings.

In FIG. 14 the aforementioned brake means between the respective telescopic conveyor sections A–D are designated as 91. Preferably the braking means 91 for braking the mutual telescopic movement between the basic conveyor section A and the intermediate conveyor section B are mounted on the outer basic conveyor section A.

Figure 15:
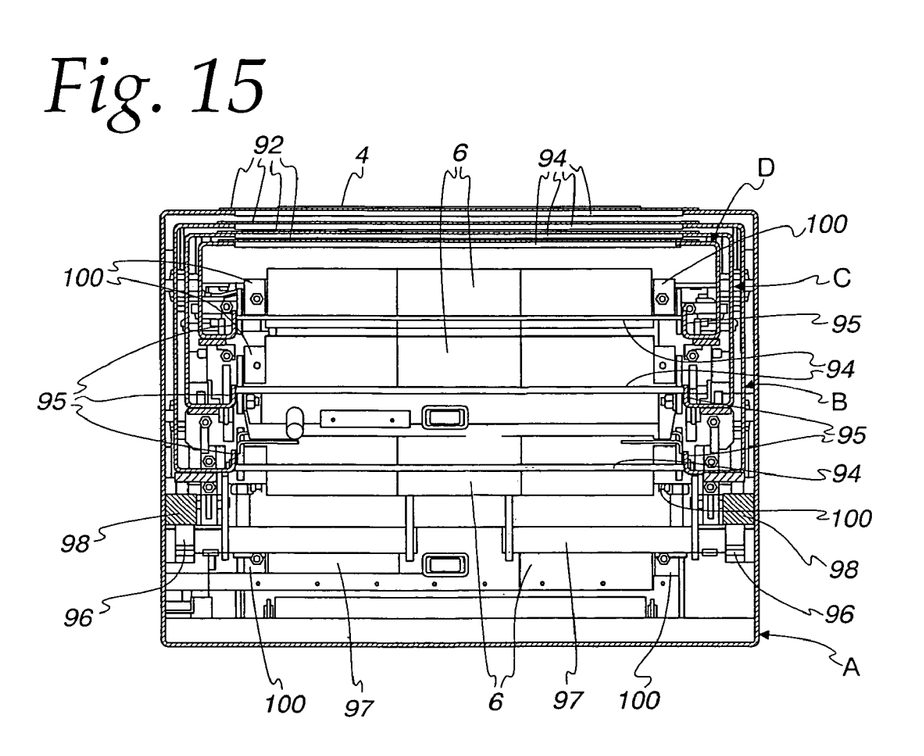
FIG. 15 shows a further transverse sectional view through said example for a telescopic belt conveyor.

In another example, in FIG. 15 a transverse sectional view through the above example of the telescopic belt conveyor is shown for illustrating the benefit of the constant-width feature of the conveyor sections. In FIG. 15 (see also FIG. 14) the constant internal width of the extendable conveyor sections is defined in relation to supporting elements 95 on which the belt rollers 6 are mounted and which arranged on the inner side of each side wall in an opposed relationship such that the width or distance between the supporting elements 95 is the same in each extendable conveyor section B, C or D, respectively. In this example the supporting elements 95 are formed of L-shaped extensions extending from the side wall of the extendable sections B, C and D inwards in a basically horizontal direction and having an upward bent part at its free end. The distance of the free ends of the supporting elements 95 on opposed side walls is the same in each of the extendable conveyor sections B, C or D, although the side wall have different distances resulting in an constant internal with of the extendable conveyor sections. The Constant internal width of the conveyor section may lead to the benefit of commonality of at least the following parts of the sections: reversing belt rollers 6 of the belt 4, crossbars 94 between both the top and the bottom of the exterior carrying girders, upper skid plates 92 for the belt and/or bottom plate covers 93, etc.

Furthermore, the structure according to this example is scalable—independent of the type of the telescopic conveyor having 3, 4 or more sections, all the mentioned parts of the telescopic sections can be of the same dimension. On of the advantages according to this example lies in terms of inventory and tooling. For example, in FIG. 15 the length of all the reversing rollers 6 are the same independent of their placement in the respective sections A–D. In a simple manner it hereby becomes possible to save inventory and tooling by working with a minimum of different parts when assembling the respective telescopic conveyor sections. Also the length of upper skid plates 92 as well as a great numbers of crossbars 94 between the respective sides of both the top and the bottom of the carrying girders may be the same according to this example. The plate thickness of the crossbars 94 is about 12 mm, while the plate thickness of the carrying girders is about 6 mm.

A rear end part of section B is provided with carrying rollers 96 mounted on outer ends of shafts 97 and cooperating with solid elongate rail members 98 secured to the inside walls of the housing of section A. The respective reversing rollers 6 is provided with belt tightening devices 100 at both ends.

In some of the above examples, the telescopic belt conveyor may be such provided that at least a lower part of said drive chains of the intermediate telescopic conveyor sections and at least at an outer partial sector, which is exposed by executing said telescoping out of said conveyor sections, is covered by means of a longitudinal covering. Preferably, the telescopic belt conveyor may be provided with said longitudinal covering consisting of a covering with mainly L-shaped cross section which is detachably mounted underneath said partial sector.

Further, in order to be able to get direct access to the drive chains for service the telescopic belt conveyor according to this example may be such provided that said mainly L-shaped cross-section provided covering at a rear side is provided with a number of mutually spaced hooks or the like, which are adapted for suspending the covering on the inside of longitudinal, carrying girders at opposite sides of said intermediate conveyor sections.

Other examples comprise drive chains on one side of the conveyor sections only and/or at least some of the drive chains are substituted by wire ropes and corresponding sprocket wheels are substituted by sheaves. Additionally some examples comprise only a base conveyor section and one extendable conveyor section.

In the above preferred examples, the configuration of the elongate drive members, e.g. the drive chains, is such that the bottom run of the elongate drive members running forward from the raised anchor points is above the bottom plane of the respective extendable conveyor sections. As one of the general benefits of this configuration, it makes the elongate drive members, e.g. the drive chains, less likely to be contacted by hands or fingers of the user. This avoids or at least minimises the risk that a person inadvertently contacting the underside of the conveyor section during the telescopic movements of the conveyor sections is injured by the elongate drive members. It is a further benefit of this drive element configuration that the exposed run of the extendable drive members may now be preferably covered. A further benefit of some of the preferred examples is that the elongate drive members may not only be covered but also completely housed within the side guides of the extendable conveyor.

It is to be understood that the invention is not limited in its application to the details of construction and the arrangement of the components set forth in the above description or illustrated in the drawings. The invention is capable of including other examples or being carried out for similar conveyors having the same function. Also, it is to be understood that the phraseology and terminology employed herein are for the purpose of description and should not be regarded as limiting.

All publications and existing systems mentioned in this specification are herein incorporated by reference.

Although certain devices and products constructed in accordance with the teachings of the disclosure have been described herein, the scope of coverage of this patent is not limited thereto. On the contrary, this patent covers all examples fairly falling within the scope of the appended claims either literally or under the doctrine of equivalents.

The invention claimed is:

1. An extendable conveyor comprising:
   a base conveyor section,
   at least two extendable conveyor sections selectively positionable relative to each other and the base conveyor section,
   a conveyor member arranged to provide a conveying surface on said conveyor sections, and
   a number of elongate drive members adapted to drive an associated extendable conveyor section in a forward or backward direction relative to the next inner extendable conveyor section or the base conveyor section, wherein an elongate drive member providing the forward movement of the associated extendable conveyor section comprises at least one anchor point disposed to a suitable height such that the elongate drive member is arranged above a bottom plane of the next inner extendable conveyor section.

2. The extendable conveyor of claim 1, wherein said at least one anchor point is mounted to the inner section following the next inner extendable section or to the base conveyor section and has a raised position relative to the bottom plane of the next inner extendable conveyor section in question.

3. The extendable conveyor of claim 1, wherein the elongate drive member providing the forward movement is connected to a respective elongate drive member providing the backward movement at the anchor point to define a continuous elongate drive member.

4. The extendable conveyor of claim 3, wherein one end of the elongate drive member providing the forward movement of the associated conveyor section is connected to a first anchor point underneath the associated conveyor section and extends around a guide element arranged in a fore area of the next inner extendable conveyor section to the common anchor point mounted to the inner section following the next inner extendable section or to the base conveyor section.

5. The extendable conveyor of claim 1, wherein the elongate drive member providing the forward movement is separately mounted from the elongate drive member providing the backward movement of the associated extendable conveyor section.

6. The extendable conveyor of claim 5, wherein the elongate drive member providing the forward movement of the associated extendable conveyor section is connected to a first anchor point underneath the associated conveyor section and extends around a guide element arranged in a fore area of the next inner conveyor section to a second anchor point which is mounted in the rear area of the inner section following the next inner section or in the base conveyor section and has a raised position relative to the bottom plane of said inner conveyor section.

7. The extendable conveyor of claim 3, further comprising an element arranged to raise the common anchor point of the forward and backward moving elongate drive members.

8. The extendable conveyor of claim 7, wherein said raising element comprises an upside-down L-shaped bracket being fixed to the next inner extendable conveyor section or to the base conveyor section in a position offset from the run of the elongate drive member.

9. The extendable conveyor of claim 8, wherein said bracket and said elongate drive members are covered from underneath by an L-shaped guard member.

10. The extendable conveyor of any one of the claims 3, wherein one end of the elongate drive member providing the backward movement of the associated conveyor section is connected to an anchor point in the back area of the associated extendable conveyor section.

11. An extendable conveyor comprising:
    a base conveyor section,
    at least two extendable conveyor sections selectively positionable relative to each other and the base conveyor section,
    a conveyor member arranged to provide a conveying surface on said conveyor sections, and
    a number of elongate drive members adapted to drive an associated extendable conveyor section in a forward or backward direction relative to the next inner extendable conveyor section or the base conveyor section, wherein at least one of said elongate drive members comprises at least a first elongate drive member providing the forward movement of an associated extendable conveyor section and a second elongate drive member providing the backward movement of said extendable conveyor section, wherein said first elongate drive member is separately mounted from said second elongate drive member.

12. The extendable conveyor of claim 11, wherein an anchor point of the first elongate drive member is disposed to a suitable height such that the said first elongate drive member is arranged above a bottom plane of the next inner extendable conveyor section.

13. The extendable conveyor of claim 11, wherein said forward moving elongate drive member extends through an open rear wall of the next inner extendable conveyor section to be anchored in the rear area of the inner section following the next inner section or in the base conveyor section in a raised position relative to the bottom plane of said inner conveyor section.

14. The extendable conveyor of claim 13, wherein a guide element is mounted at such a height that the elongate drive member can be guided through the open rear wall of the next inner conveyor section.

15. The extendable conveyor of claim 1, wherein one end of said elongate drive member is mounted at the anchor point in the rear area of the inner section following the next inner conveyor section or in the base conveyor section in a raised position relative to the bottom plane of said inner conveyor section.

16. The extendable conveyor of claim 1, wherein a guide element for leading the forward moving elongate drive member is mounted at such a height that the elongate drive member does not cross a bottom plane of the next inner extendable conveyor section.

17. The extendable conveyor of claim 1, wherein a guide element for leading the backward-moving elongate drive member is mounted in the rear area of the next inner conveyor section.

18. The extendable conveyor of claim 1, wherein a guide element for leading the backward-moving elongate drive member is mounted on the outside of the rear wall of said conveyor section.

19. The extendable conveyor of claim 1, wherein the elongate drive members comprise drive chains.

20. The extendable conveyor of claim 19, wherein wire ropes are used as a substitute for the drive chains which cause the movement of the outermost extendable conveyor section in respect of the next inner extendable conveyor section.

21. The extendable conveyor of claim 1, wherein at least an exposed bottom part of the at least outermost of said conveyor sections is covered.

22. The extendable conveyor of claim 3, wherein the elongate drive members are arranged to be housed within the side guides of each conveyor section.

23. The extendable conveyor of claim 1, wherein the conveyor member comprises an endless conveyor belt.

24. An extendable conveyor comprising:

a base conveyor section, at least two extendable conveyor sections selectively positionable relative to each other and the base conveyor section, a conveyor member arranged to provide a conveying surface on said conveyor sections, and a number of elongate drive members adapted to drive an associated extendable conveyor section in a forward or backward direction relative to the next inner extendable conveyor section or the base conveyor section, wherein at least an exposed bottom part of the at least outermost of said conveyor sections is covered.

* * * * *